No. 612,830. Patented Oct. 25, 1898.
L. C. CROWELL.
FOLDING AND STAPLING MACHINE.
(Application filed Oct. 21, 1895.)
(No Model.) 10 Sheets—Sheet 1.
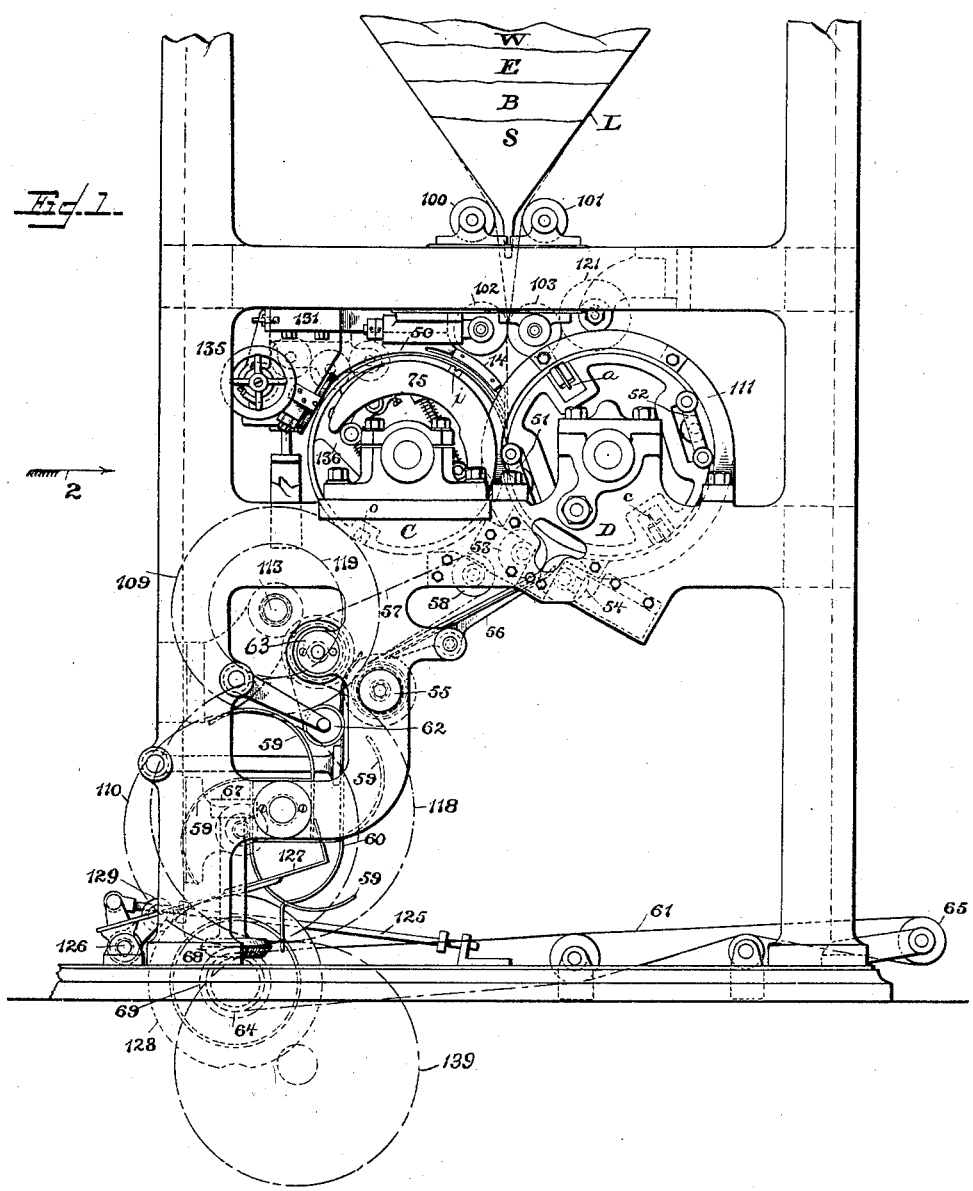

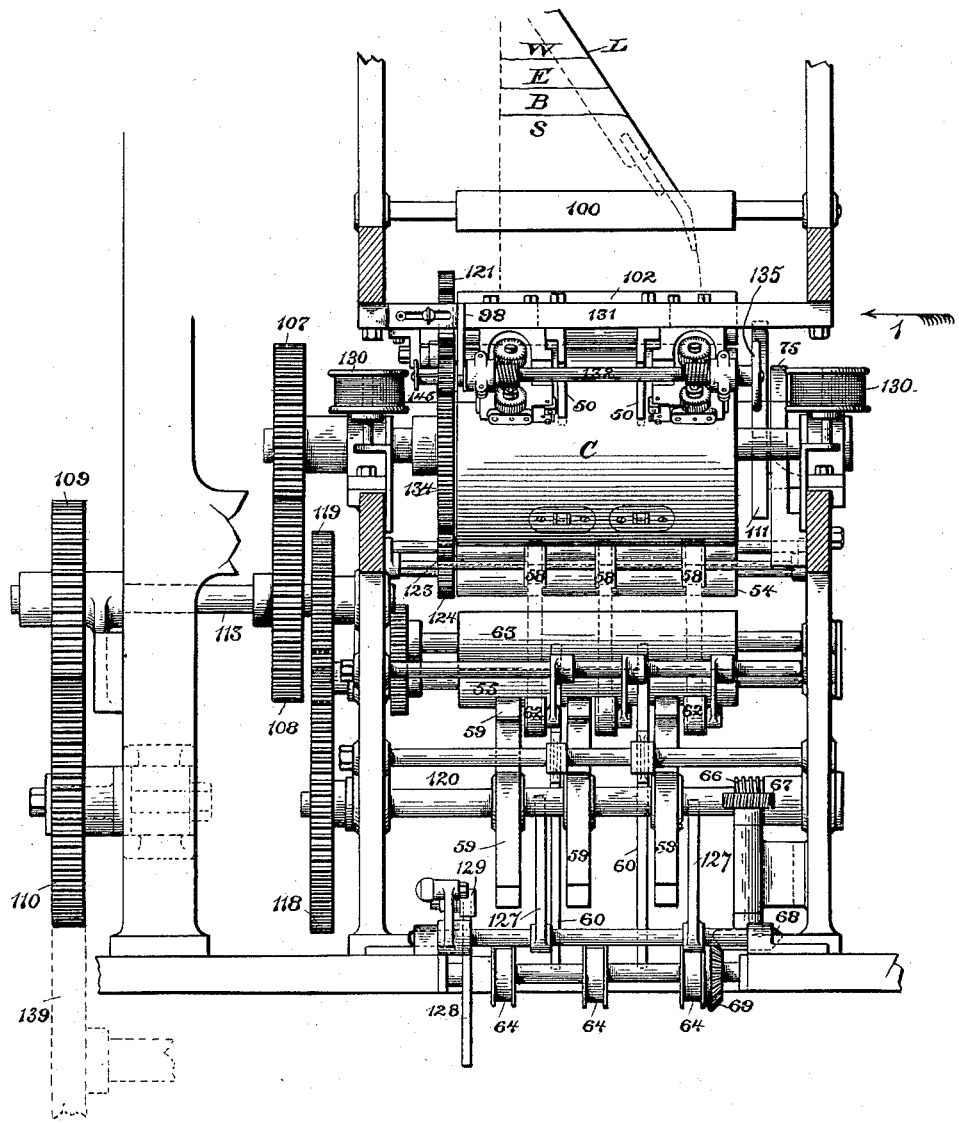

No. 612,830. Patented Oct. 25, 1898.
L. C. CROWELL.
FOLDING AND STAPLING MACHINE.
(Application filed Oct. 21, 1895.)
(No Model.) 10 Sheets—Sheet 3.
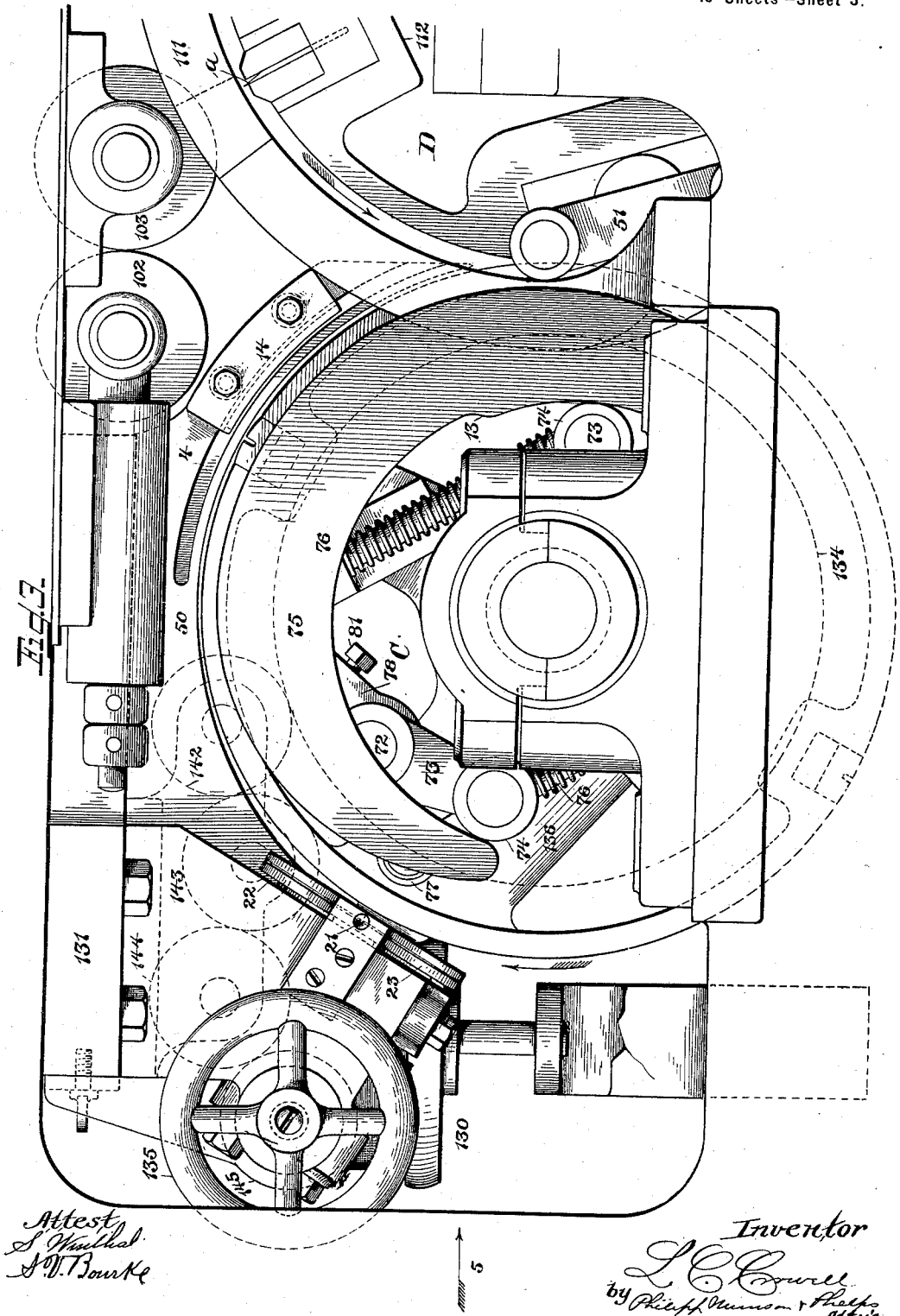

No. 612,830. Patented Oct. 25, 1898.
L. C. CROWELL.
FOLDING AND STAPLING MACHINE.
(Application filed Oct. 21, 1895.)
(No Model.) 10 Sheets—Sheet 4.
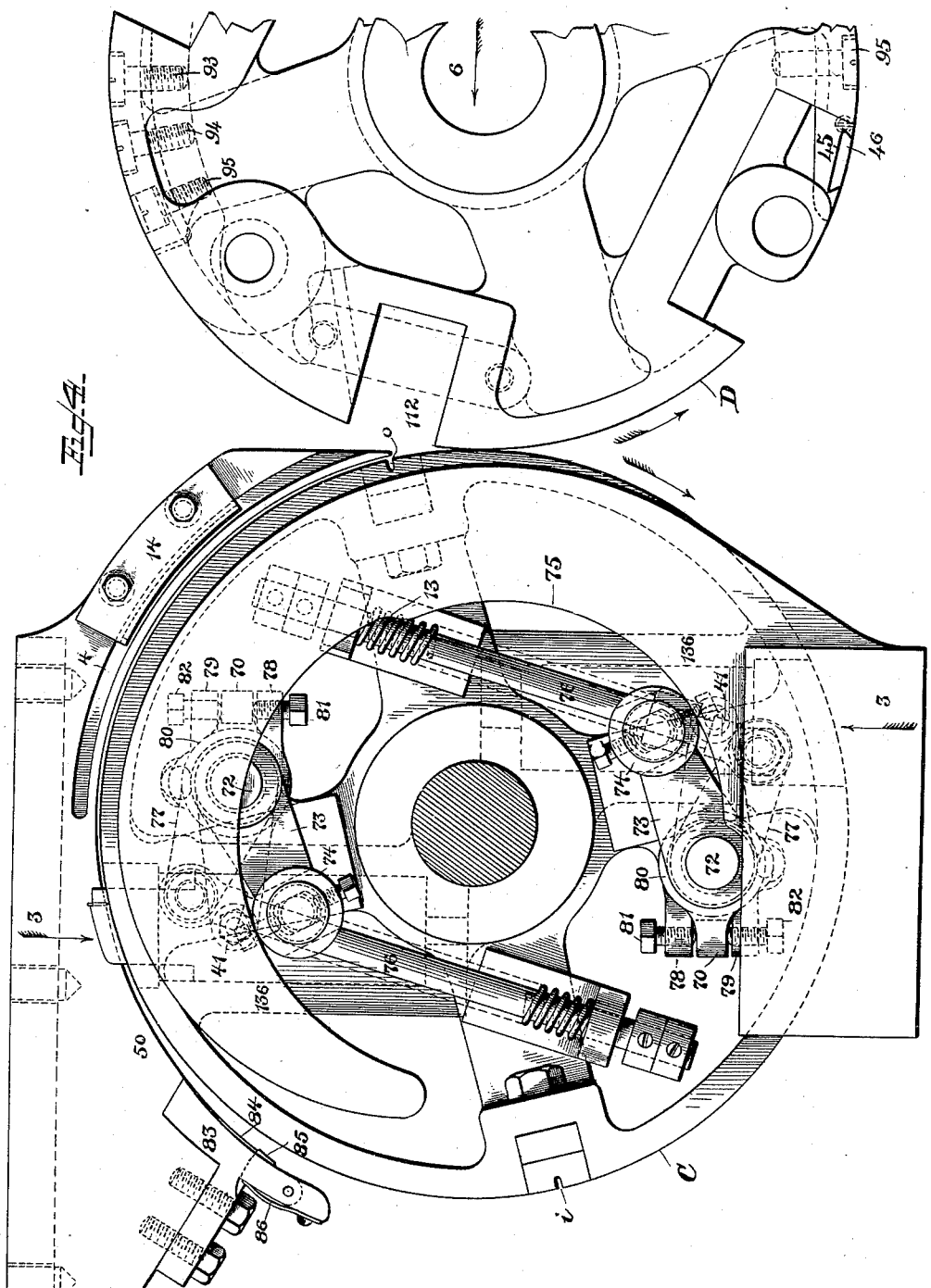

No. 612,830. Patented Oct. 25, 1898.
L. C. CROWELL.
FOLDING AND STAPLING MACHINE.
(Application filed Oct. 21, 1895.)
(No Model.) 10 Sheets—Sheet 5.
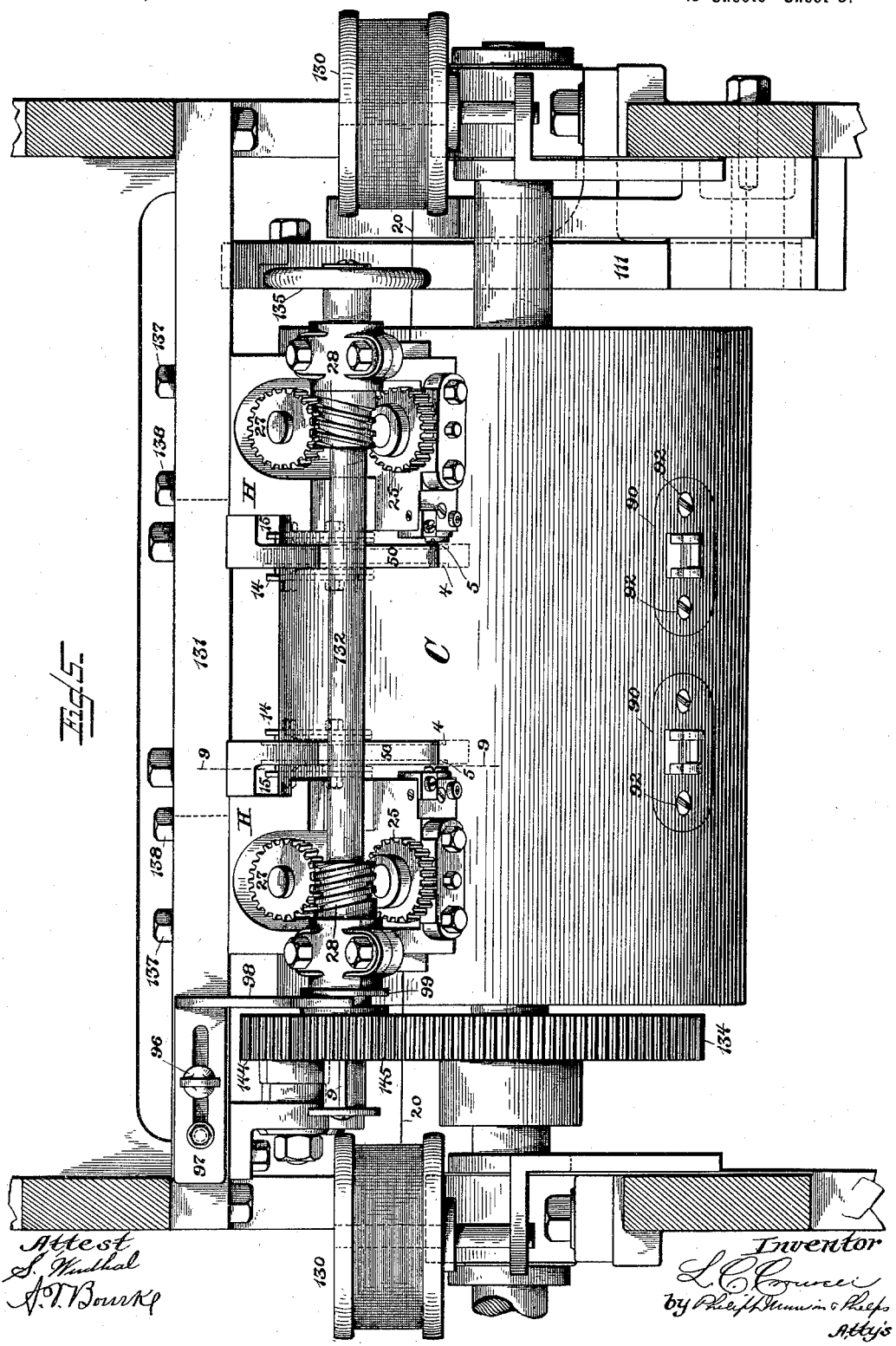

No. 612,830. Patented Oct. 25, 1898.
L. C. CROWELL.
FOLDING AND STAPLING MACHINE.
(Application filed Oct. 21, 1895.)
(No Model.) 10 Sheets—Sheet 6.
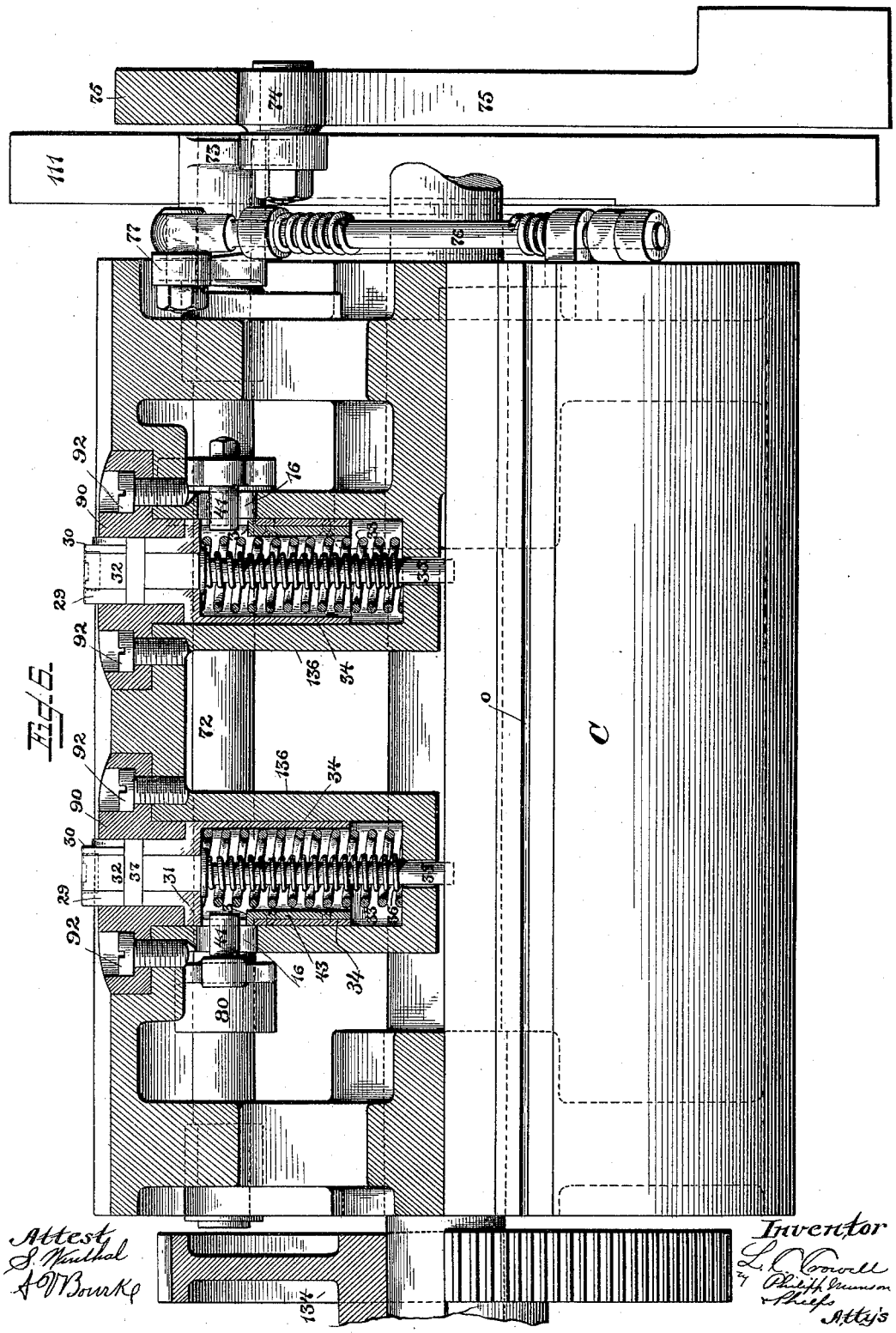

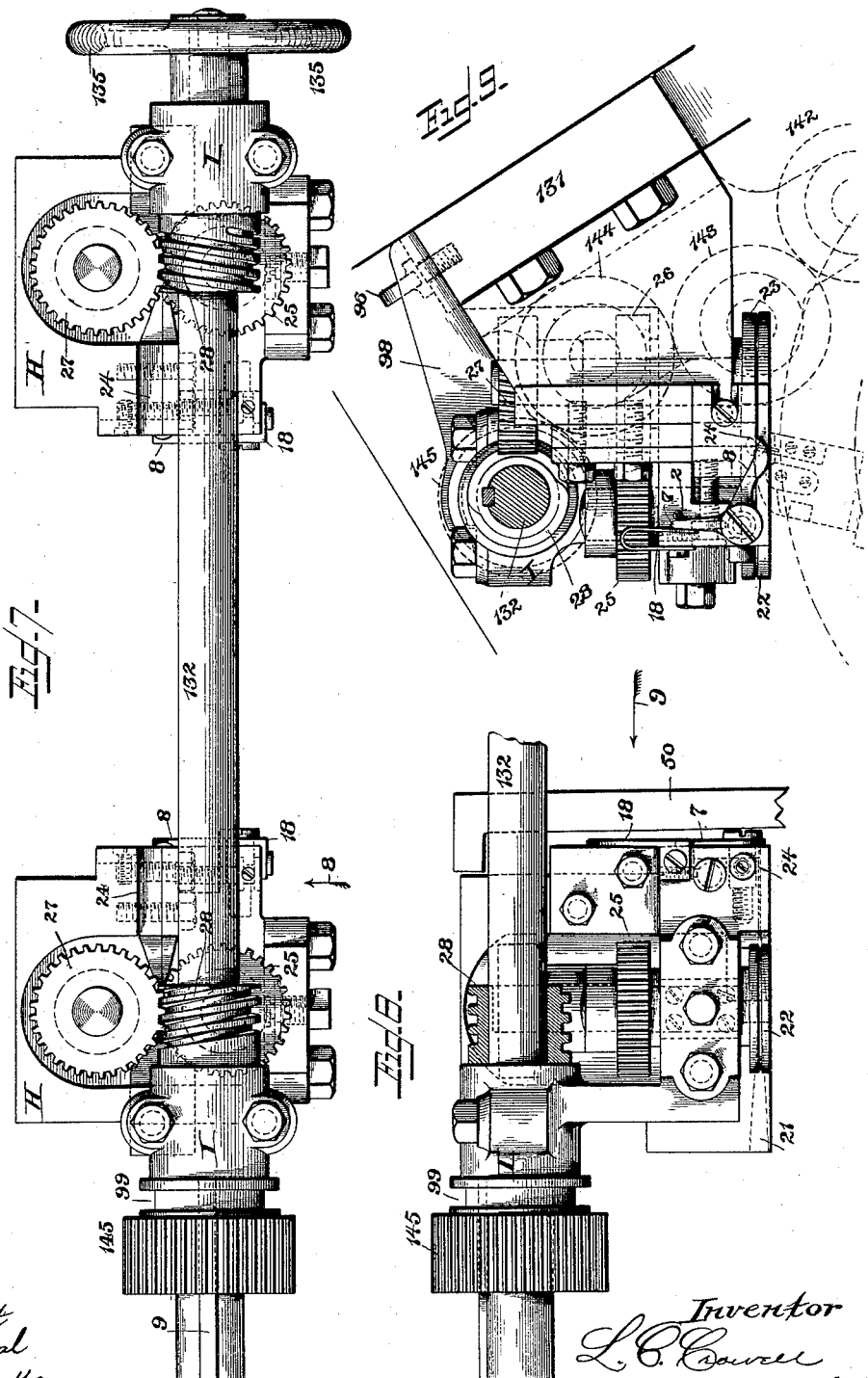

No. 612,830. Patented Oct. 25, 1898.
L. C. CROWELL.
FOLDING AND STAPLING MACHINE.
(Application filed Oct. 21, 1895.)
(No Model.) 10 Sheets—Sheet 8.
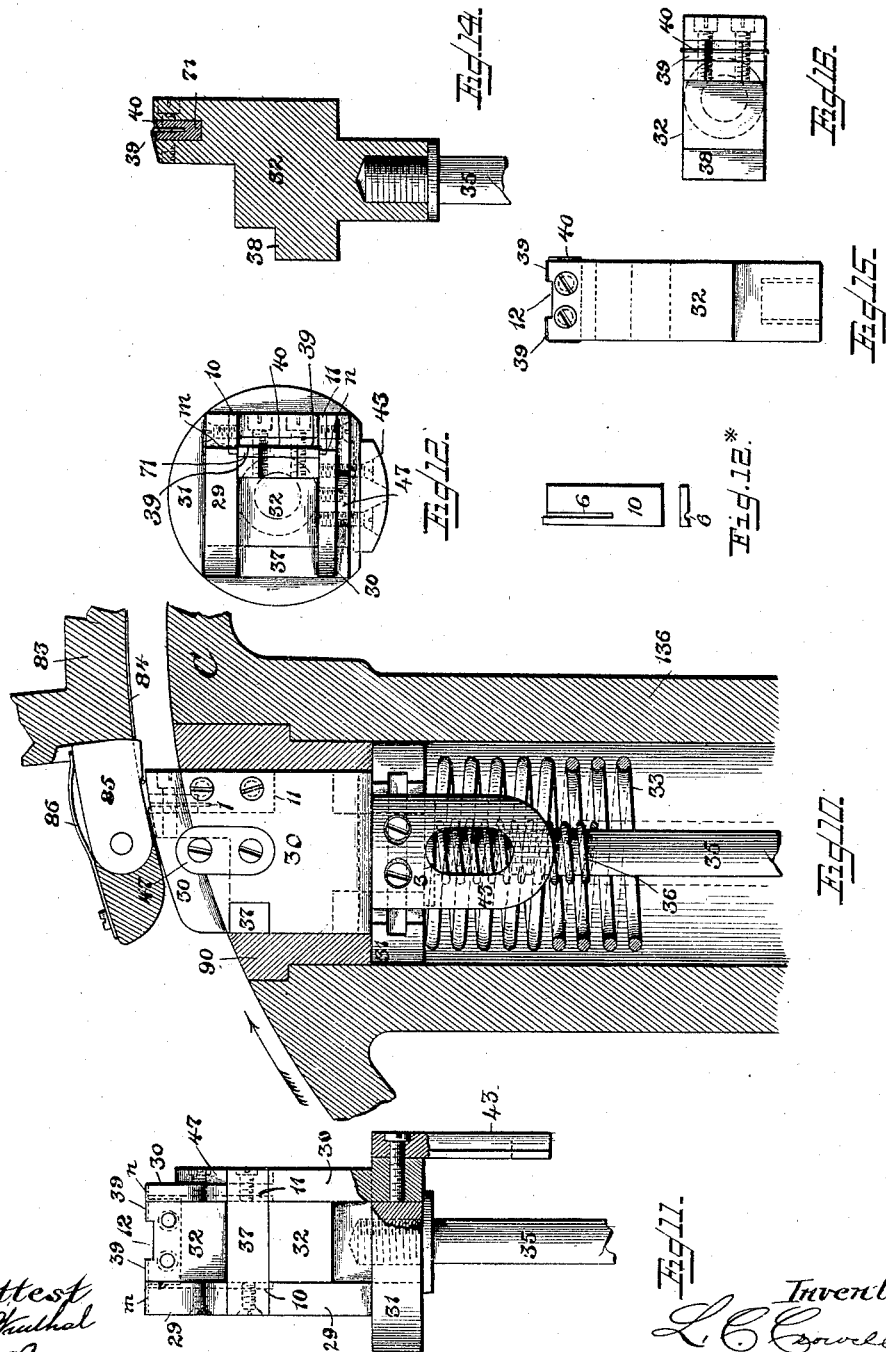

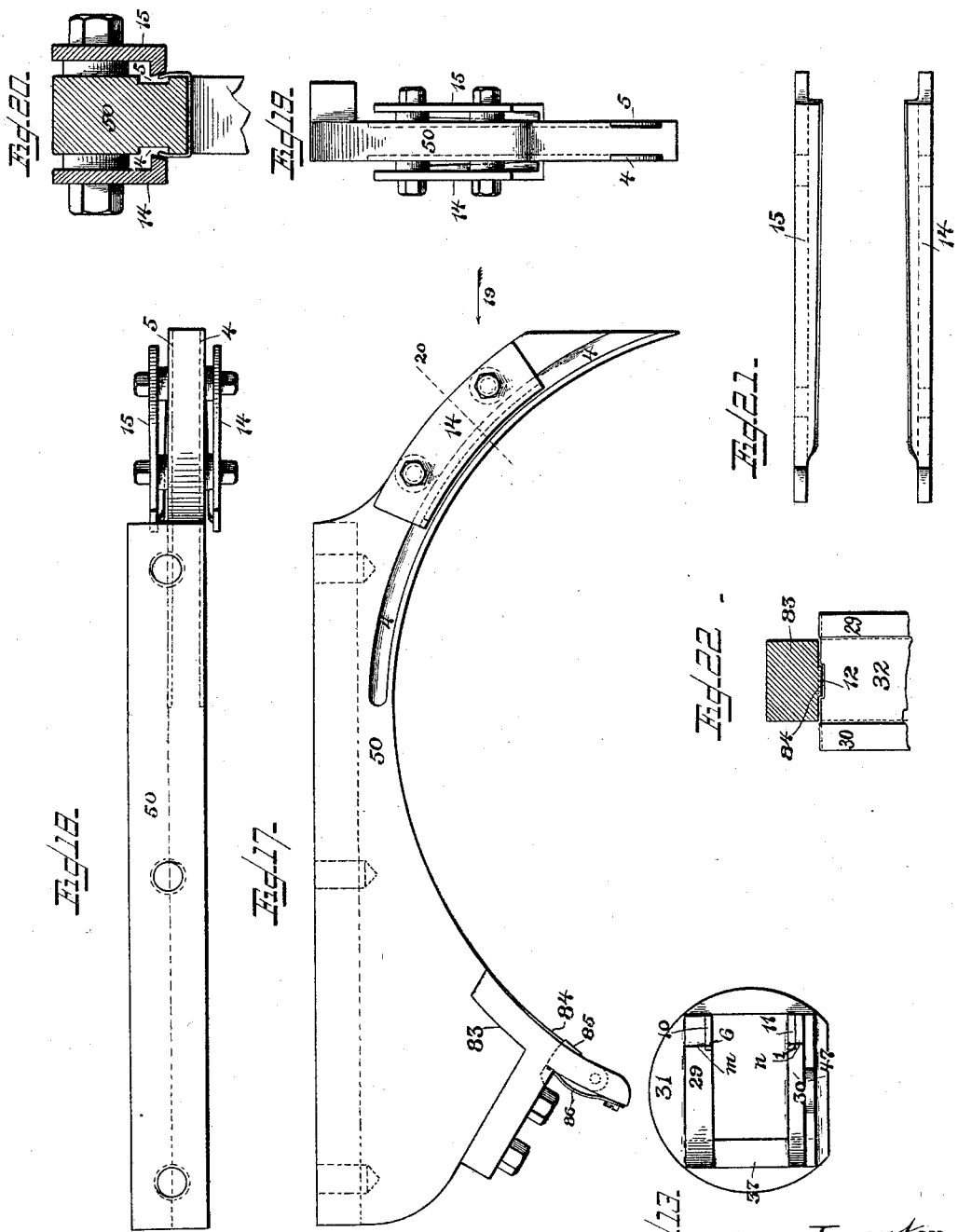

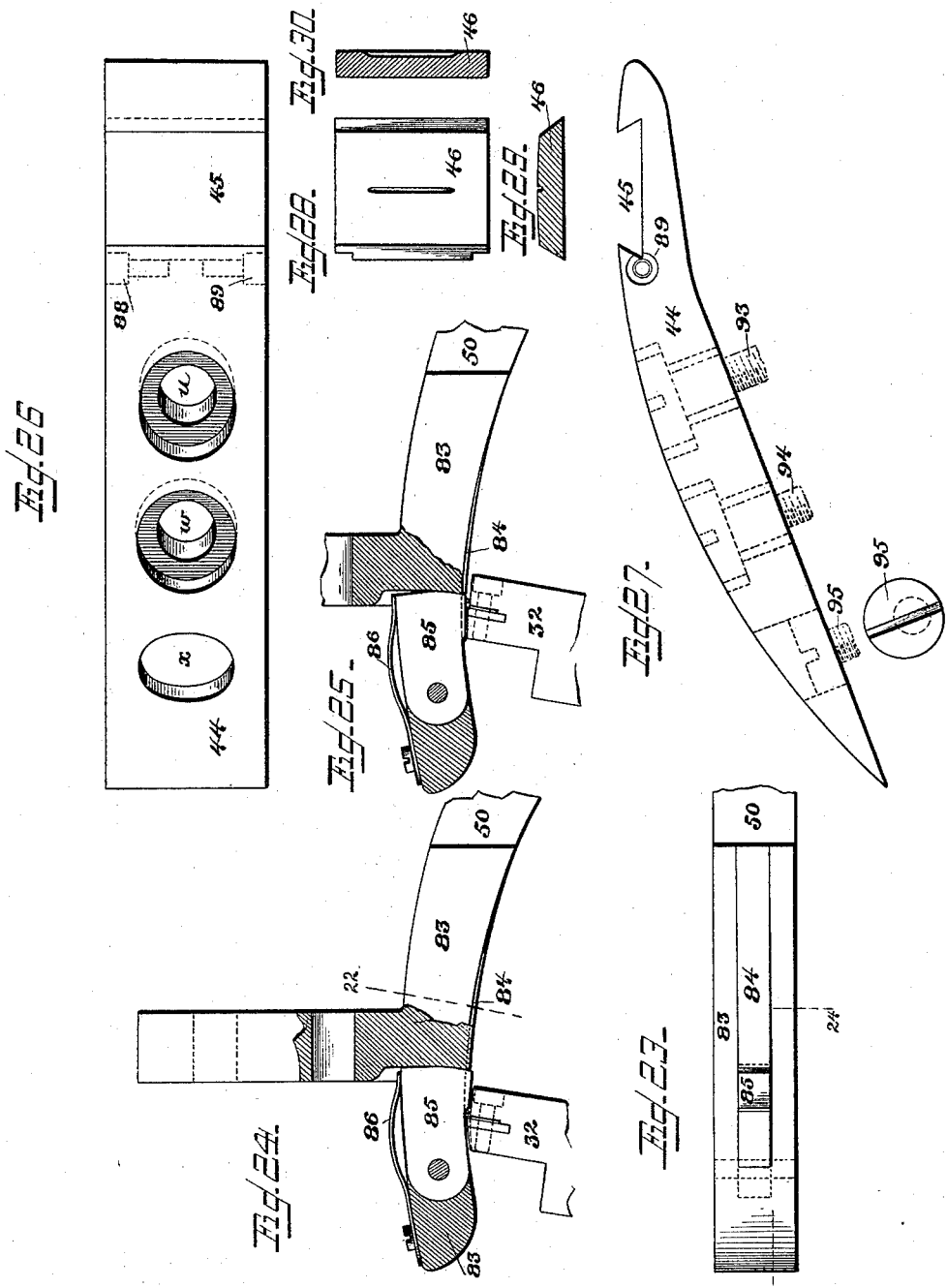

UNITED STATES PATENT OFFICE.

LUTHER C. CROWELL, OF NEW YORK, N. Y., ASSIGNOR TO ROBERT HOE, THEODORE H. MEAD, AND CHARLES W. CARPENTER, OF SAME PLACE.

FOLDING AND STAPLING MACHINE.

SPECIFICATION forming part of Letters Patent No. 612,830, dated October 25, 1898.

Application filed October 21, 1895. Serial No. 566,348. (No model.)

*To all whom it may concern:*

Be it known that I, LUTHER C. CROWELL, a citizen of the United States, residing at New York, (Brooklyn,) county of Kings, and State of New York, have invented certain new and useful Improvements in Newspaper Folding and Staple Binding Machines, fully described and represented in the following specification and the accompanying drawings, forming a part of the same.

The improvements constituting the present invention relate to that class of newspaper folding and staple binding machines broadly embraced in Letters Patent No. 510,528, dated December 12, 1893, and more specifically to that modified structure of that class of machines also embraced in Letters Patent No. 510,840, dated December 12, 1893; and the present invention consists in improvements in the construction and operation of means for holding the wire while being severed to form a staple length, in severing said staple length while it is being swept forward and formed into a staple, in fastening the extremities of its legs into a form that constitutes incipient bends in the directions they are forced in the clenching operation, and of various other constructions of parts and combinations of devices whereby useful operations are effected, all of which are hereinafter fully described, and set out in the claims.

A practical embodiment of this invention is fully illustrated in the accompanying drawings, in which—

Figure 1 is a front elevation as seen looking in the direction of arrow 1 in Fig. 2, and Fig. 2 a side elevation, partly in section, as seen looking in the direction of the arrow 2 in Fig. 1, these views showing a delivery apparatus for printing-machines provided with stapling mechanisms, whereby plies or sheets of the product are bound together in a book-like package. Fig. 3 is a front end elevation, on a larger scale, of a portion of said delivery apparatus as seen looking in the direction of arrow 1 in Fig. 2. Fig. 4 is a like view, with framework removed, of many of the same parts, but in a different position of their operation. Fig. 5 is an elevation of one side of the stapling-tool carrier and associated devices as seen looking in the direction of the arrow 5 in Fig. 3. Fig. 6 is an elevation, partly in section, of the opposite side of the stapling-tool carrier as seen looking in the direction of the arrow 6 in Fig. 4, said carrier having been so far rotated as to cause its tools to stand upright and the sectional view thereof being taken vertically through the upper set. Fig. 7 is a plan view of the wire-feeding devices, the wire-cutters being removed. Fig. 8 is a side elevation of one end of the same, showing its relation to the staple-forming anvil and wire-cutter. Fig. 9 is an end elevation of the wire-cutting devices, taken on the section-line 9 of Fig. 5, as seen looking in the direction of the arrow 9 in Fig. 8, to be read as indicated by its caption, Fig. 9. Fig. 10 is an enlarged central sectional elevation of one of the stapling-tools in position in the cylinder or carrier, the view being taken at right angles to the sectional elevation of the same parts as shown in Fig. 5. Stock 34 of Fig. 6 is omitted. Fig. 11 is a rear elevation of the staple bending and setting tools and appendages removed from the carrier. Fig. 12 is a plan view of the same. Fig. 12* shows an inside or facial elevation of one of the channeled plates of the bending-tool and also a plan view of the same. Fig. 13 is a plan view of the staple-bending tool with the setting-tool removed. Fig. 14 is a central sectional elevation of the setting-tool or driver removed from its associated parts. Fig. 15 is a front elevation of the same. Fig. 16 is a plan view of the same. Fig. 17 is a side elevation of the staple-forming anvil. Fig. 18 is a plan view of the same. Fig. 19 is a front end elevation of the same. Fig. 20 is an enlarged sectional elevation of the same on the section-line 20 of Fig. 17. Fig. 21 is a plan view of the staple-leg-bending plates. Fig. 22 is an enlarged sectional elevation of the forming-anvil, taken on the section-line 22 of Fig. 24, and an elevation of the face of the stapling-tools. Fig. 23 is a facial view of the under side of the rear end of the staple-forming anvil. Figs. 24 and 25 are enlarged side elevations of the rear end of the forming-anvil, being partly in section, on the section-line 24 of Fig. 23, Fig. 24 showing the setting-tools coöperating therewith in one position of their operation, the bending-arms being omitted for clearness of illustration, and Fig. 25 showing the same in another position of their operation. Fig. 26 is an enlarged plan view of the clenching-die holder detached from its carrier. Fig. 27 is a side elevation thereof. Fig. 28 is a plan view of the clenching-die removed from its holder, Fig. 29 being a longitudinal central elevation thereof, and Fig. 30 being a tranverse central sectional elevation thereof.

The delivery apparatus shown, in which the present improvements are embodied, consists in a general sense of a longitudinal folder L, external turners 100 101, and fold-laying rollers 102 103, as is more fully explained in Patent No. 331,280, dated December 1, 1885. Its delivery-cylinders C D are provided, respectively, with cutting-knives $a$ $c$ and cutting-slots $i$ $o$, the cylinder D being additionally provided with double rotating folding-blades 51 52, that coact with folding-rollers 53 54, and the folding-rollers 53 54 have a sheet-pathway extending therefrom to a roller 55, which pathway consists of a conductor 56 and sets of tapes 57, running from pulleys 58 over the roller 55, tightening pulleys 62, and returning over a roller 63 to the pulleys 58. Arranged beneath the discharging end of said pathway there is a sheet-delivery embodying a rotating fly that consists of curved arms 59 and which, aided by a coöperating guard 60, lays the folded sheets upon sets of discharging-tapes 61, that run over pulleys 64 65 and suitable intermediates.

The cylinders C D are mounted to revolve in journal-bearings provided in the framework, and their shafts are geared together, so as to revolve them in unison, by means of toothed wheels, only one—134 for carrier C—of which is shown, and said cylinders are driven through a wheel 107 on the shaft of the cylinder C, which gears with a wheel 108, fast on a shaft 113, which carries a wheel 109 outside the frame, which will be connected, with its driver, as through wheels 110 139, with a driven shaft of the printing-machine. The fold-laying rollers 102 103 are geared together by pinions at one end, to which motion is imparted by an intermediate 121, meshing with a toothed wheel on the end of cylinder D, which wheel is not shown, but is a companion to 134, which is upon the shaft of carrier C. The rotating folding-blades 51 52 are maintained in their normal or inoperative positions by means of a curved guard 111 and are caused to make semirotations, when projected into and withdrawn from the folding-rollers 53 54, by any of the means now common in this art, for instance as in Patent No. 171,196.

The folding-rollers 53 54 are geared together by pinions 123 124, the pinion 123 on the roller 53 meshing with the toothed wheel on the cylinder D. The cutting-knives $a$ $c$, carried by the cylinder D, which may be of any construction, are supported in holders that are inserted in sockets, as 112, and the cutting-slots $i$ $o$ are similarly constructed and mounted in the cylinder C.

The rotary fly 59 and discharging-tapes 61 are driven from the shaft 113 by means of wheels 119 118, communicating rotary motion to the fly-shaft 120, which latter carries near one end a worm 66, that engages a worm-wheel 67 on one end of a vertical shaft, which at its other end carries a bevel-gear 68, engaging a similar bevel-gear 69 on the shaft of the tape-pulleys 64. This pulley-shaft is also provided with a cam-disk 128, upon which bears a rock-arm 129, held to duty by a spring-arm 125, by which devices, after a suitable number of revolutions of the fly, the shaft 126 is rocked slightly to thrust the pusher-bar 127 forward and cause it to throw outward the folded sheet then being delivered, so that its projected relation to the rest of the sheets may indicate the number that has been delivered or piled on the tapes 61. Such a delivery mechanism operates as follows: One or any number of webs of paper W E B S, received from one or any number of printing-machines, in passing through the longitudinal folding mechanism will be plicated by longitudinal folding, and this plicated product, upon emerging from the fold-laying rollers 102 103 and being guided and conveyed to and between the carriers C D, will be severed into sheet lengths, and such sheet lengths will be doubled or folded into the nip of folding-rollers 53 54 by one of the rotating folding-blades 51 52, and these folded sheets, in emerging from said folding-rollers, will enter the sheet-conducting pathway and passing over the roller 55 descend vertically therefrom and directed by the guides 60 enter into one of the sets of curved arms 59 of the rotary fly and be laid down thereby flat upon the tapes 61, which, moving outwardly, will ultimately deliver said folded pack. In order that the sheets composing said folded pack may be bound together to constitute a book-like product, this delivery is provided with stapling mechanisms, whereby from separate wire lengths two staples are made and not only inserted through the plies composing said product on the binding or last folding line thereof, but said staples have their projecting legs bent down or clenched upon said plies, so that when the product is folded its binding-staples present their crowns on the outside and their clenched legs upon the inside of said product.

The wire feeding and cutting mechanism and the staple bending, presenting, and setting mechanisms are associated with the cylinder C, while the staple-leg-clenching devices are carried by the cylinder D.

As two staples are simultaneously made, inserted, and set and the various mechanisms therefor are duplicates, a description of one set will apply to both, and either will be readily understood from this description, since like reference characters distinguish like parts in each mechanism.

The fine mild-steel wire 20 from which the staples are to be made is fed inwardly parallel with the cylinder-face toward the bending mechanisms from spools 130, mounted to turn on spindles journaled in brackets carried by the frames, being directed through a guide-slot 21, (see Fig. 3,) passing between feeding-wheels 22 23, (see Figs. 3, 8, and 9,) and thence through a guide-slot 24 in a block that supports the wire close up to the point of severance.

Each wire-feeding mechanism is mounted in a head H, by which the same are adjustably secured to the cross-bar 131 by means of holding-screws 137 138, which heads sustain the journals I for the shaft 132. Each feeding mechanism consists of two grooved feeding-wheels 22 23, carried by spindles that turn in bearings in said head, which spindles carry wheels 25 26, (see Fig. 9,) gearing them together for uniform movement, the spindle of the wheel 23 being extended to support a worm-wheel 27, which is engaged by a worm 28, that is splined on the worm-shaft 132. This worm-shaft is journaled in and supported by the heads which carry the feeding-disks and is rotated by means of a pinion 145 at one end, which meshes with one, 144, of a train of intermediate gears 142 143 144, connecting it in gear with a wheel 134, fast on the shaft of the cylinder C, which worm-shaft 132 is elongated at the end bearing this pinion 145, so that the latter may slide thereon, and thus be moved into and out of mesh with its driver the gear-wheel 144, and so cause or stop the movement of the wire-feeding wheels 22 23, in carrying out which operations said pinion slides on a spline 9, with which the worm-shaft 132 is provided, and to maintain this pinion in either position of its adjustment it carries a grooved collar 99, into which projects the yoked end of a retaining-arm 98, (see Fig. 5,) a right-angular branch 97 of which plays against the face of the cross-bar 131, and has an adjusting-slot, through which passes a set-screw 96, by which its desired position is secured. By these means the feeding of the wire may be stopped and the production of staples be suspended at any desired time—as, for instance, in slowly operating the printing-machine in making ready. For the purpose of testing the stapling devices in adjusting them this worm-shaft 132 is provided with a hand-wheel 135 at one end, by which the wire-feed may be operated without running it from and at the speed of other parts.

When a staple length of wire is advanced by the feeding-wheels 22 23, it is protruded beyond the mouth end of the slot of the guide 24 and requires to be detached from its body portion in order to be free, so as to be convertible into a staple. To perform this detaching or severing operation, a movable cutting-blade 8 is so pivoted to the feed-roller head as to be capable of sweeping past and in shearing relation to the mouth or delivery end of the wire-slot of the guide 24, and this blade 8 has a tailpiece 7, which bears in one direction upon a stop 2 and is borne upon by a spring 18 to normally hold it in contact with said stop 2, and when thus normally held in place the shearing edge of the cutter 8 will be close to but not in the pathway of the wire, although it may cross the same. The vibratory movement of this cutter to sever the wire is caused by contact therewith of the staple-bending tool, brought about periodically as said tool in its rotative path of travel sweeps past the point occupied by the wire, which operation will presently be more particularly explained.

The movable stapling-tools are supported in the cylinder C, by which they are carried in a rotative path of travel, operating, first, to cause a wire length to be detached, then, while carrying the same onward, coöperating with a curved forming-anvil that is fixed over the cylinder to convert said wire length into a staple, then to force the staple-legs through the material passed between the cylinders C D, and, finally, in conjunction with a die carried by the cylinder D, operating to bend or clench the staple-legs down onto the said material.

As herein illustrated, there are two sets of stapling-tools arranged lengthwise of the cylinder C, and by reason of its being equal circumferentially to the size of two products the stapling-tools are duplicated at opposite points of the cylinder. All being alike, a description of one will apply to all, and like characters of reference are therefore placed upon like parts that this description may be read in connection with either of the stapling mechanisms. In each set there are two stapling-tools, the staple-bending arms and staple-setting tool or driver between them, and they are supported in a circular socket 136, cast with the cylinder C, (see Figs. 3, 4, 6, and 10,) and having a closing-cap 90, with winged sides to provide for the reception of securing-screws 92. (See Figs. 5 and 6.)

The staple-bending tool (see Sheet 8) has two side arms 29 30, which constitute what is sometimes called a "staple-bending fork," which arms are parallel and separated a suitable distance to admit of the play between them of the setting-tool or driver 32. The rearward portions of these arms 29 30 of the staple-bending tool, which are guided in a rectangular opening through the closing-cap 90, are extended to provide it with shoulders $m$ $n$, which project a distance about equal to the diameter of the wire operated on, the front faces of which shoulders are alined or coincide with the rear face of that portion of the driver which is the actual setting-bed, in this example the plate 40. The arms 29 30 are provided with steel wearing-pieces 10 11 in their inner faces, in which are cut staple-leg-guiding channels 1, 6, (see Figs. 10 to 13, inclusive,) in which the laterally-projecting edges of the plate 40 or setting-bed are guided in the reciprocation of the driver. These arms 29 30 project from a circular base 31, which slides in guiding contact with the circular inner wall of the socket 136, at the same time acting as a stop, in connection with the inner end of the cap 90, to limit the outward protrusion of the arms 29 30, said staple-bending tool being constantly pressed outward by means of a coiled spring 33 within the socket 136. If a more perfect or longer guiding-bearing for the staple-former is desired, it may be provided with a hollow shank or guide 34, projecting inwardly from its base 31, within which its spring 33 will be held. (See Fig. 6.) The driver 32 has a rectangular body by which in its longitudinal movements it is guided in a similar-shaped opening provided between the arms 29 30 and the walls of the cap 90. It has a central stem 35, projecting inwardly and guided at its free end in a circular hole cut through the bottom of the socket 136. This driver 32 is constantly pressed outwardly by means of a coiled spring 36, encircling its stem 35 and bearing upon a collar at the upper end of the stem and the inner face of the bottom of the socket 136, its longitudinal movement with respect to the arms of the staple-bending tool being limited by a transverse stop-bar 37, carried by the arms of the bending-tool, against which a shoulder 38 on the driver bears.

The working face or actual setting-bed of the driver 32 is a hardened-steel plate 40, let into a block or holder 71, that is supported in a socket cut into the outer end of the driver. This setting-bed or plate 40 is of a thickness equal to—it may be slightly in excess of—the diameter of the wire operated upon, and its working face, which is the actual setting-bed, should be flush with the front portion of the end face of its holder. The rearward portion of the end face of the setting-bed holder, or that part of it which lies immediately behind the setting-bed, projects beyond the setting-bed or plate 40 to a distance about equal to the diameter of the wire from which the staple is to be formed, so as to constitute an abutment 39, which conforms or may conform with the height of the shoulders $m\,n$ of the staple-bending arms. The sides of this plate 40 project laterally (see Fig. 15) to a distance equal to or slightly greater than the diameter of the wire and play in the staple-leg-guiding channels 1 6, (see Fig. 13,) cut in the inner faces of steel plates 10 11, with which the arms 29 30 of the staple-bending tool are provided. The shoulders $m\,n$ of the bending-arms 29 30 and extended abutment 39 of the driver are at the time of cutting the wire and during its incipient forward movement alined and constitute a wire-supporting abutment, and they are hereinafter collectively and singly referred to as such, but it will be understood that the inward movement of the driver at times separates them. By constructing the abutment 39 of the driver so that it projects slightly less in extent than the diameter of the wire operated upon and by making the wire-grooves 1 6 of like relation to the wire operated upon the great advantage will be had of compelling each wire length converted into a staple to take up all of the wear occasioned by that operation, thus transferring such wear from the face of the setting-tool and its driver to the wire length during its conversion into a staple, which is performed while the bending-arms and driver sweep the wire length over the forming-anvil, and as the wire is of softer material than said anvil it takes the wear instead of said anvil, with the face and sides of which it is in contact while being so swept forward and having its ends upturned to form legs.

The longitudinal movement of the stapling-tools in carrier C is in part controlled through a rock-arm 41, that protrudes through an opening 16 in one side of the socket 136 and engages in an elongated bearing-slot 3, with which the shank or guide 34 of the staple-bender is provided, this shank or guide being preferably provided with a plate 43 to furnish a broader bearing for said arm 41. When the cylindrical shank 34 is omitted, as in Figs. 10 and 11, the plate 43, having a bearing-slot 3, may be secured to the base 31 of the bending-tool. This rock-arm 41 projects from a rock-shaft 72, that is journaled in the cylinder-heads, and is rocked by means of a rock-arm 73, fast to said shaft, and having an antifriction-roll 74, that bears against the inside surface of a cam 75, fixed near one end of the cylinder C, and the rock-arm 73, and with it the arm 41, is constantly pressed outwardly, so as to cause its roll 74 to properly contact with the cam 75 by means of a spring-rod 76, that moves in guides attached to the cylinder-head, and is connected to the shaft 72 by a rock-arm 77.

It is to be observed that although the staple-forming anvil and the parts it carries may be so related in their assemblage as to properly coact with the staple bending and setting tools, wire-cutting devices, and clenching-die it becomes necessary in consequence of the small size of the wire used in this machine and the high speed at which said machine must be run in practice that the tools which support the wire while being severed into a staple length and which carry said staple length onward in the operation of forming it into a staple by bending its ends into legs and set the same in the material shall be provided with means for fine adjustment and accurate performance. One way of accomplishing this is illustrated herein, (see Fig. 4,) and it consists in controlling the action of the rock-arm 41, whereby the movements of the stapling mechanisms are at times governed, and this is accomplished by providing the rock-shaft 72 with an adjusting-stop consisting of a toe 70, fixedly projecting from said shaft and arranged to extend between arms 78 79, which constitute rearwardly-extended portions of the rock-arm 41, that carry, respectively, adjusting-screws 81 82, whereby the position of the rock-arm 41 relative to its actuating rock-arm 73 may be adjusted and the position of its operating end in the slot 3 of the shank or guide 34 of the staple-bending arm be determined. As the setting-tool follows the outward movement of the bending-arms, their correlation being fixed by the bar 37 and the outward protrusion of both being limited by the base 31 engaging the cap 90, it will be understood that when both are fully protruded, as in Fig. 10, these tools are properly positioned for coaction with the means for cutting the wire and for performing the operation of converting the detached wire length into a staple as they move onward over the anvil 50 and reach the position shown in Fig. 4, during which onward movement the setting-tool is moved inward. This inward movement of the setting-tool or driver 32 in its transit from the position it has in Fig. 10 to the position attained in Fig. 4 is caused by the eccentric portion of the face of the anvil 50 acting against the pressure of the spring 36, which inward movement ceases when the concentric portion of the anvil-face is reached, as in Fig. 4. At this time the detached wire length will have had its ends bent against the sides of the anvil and at right angles to its crown, thus constituting it a staple the crown of which rests against the driver 32 or setting-bed 40 thereof, while its legs are supported in the guiding-channels 1 and 6 of the staple-bending arms 29 and 30.

In former constructions of rotative stapling mechanisms the withdrawal of the bending-arms from the staple-legs, while the staple is maintained stationary by resting upon the driver or setting-bed thereof has been accomplished by contact of said arms with the carrier bearing the setting-die, whereby the said arms are pressed inwardly against the resistance of their supporting-springs as the staple-legs are entered into the setting-die and clenched. Practically it is found to be detrimental to permit the blow to be made which results from that mode of operation and which is occasioned by the sudden contact of the said arms with the face of said carrier, and hence the new mode of operation, provided by the means heretofore described for positively withdrawing said arms through the rock-arm 41, has been adopted.

It will now be understood that from or about the time that the limit of the inward movement of the setting-bed has been reached and the staple is completed, as in Fig. 4, the bending-arms 29 30, as they approach and pass the clenching-die in the carrier D, must be withdrawn. This is gradually accomplished by means of the rock-arm 41, which moves inoperatively from its position midway of the slot 3 into operative contact with the lower face of the said slot 3, while the stapling-tools move from the position of Fig. 10 to that of Fig. 4, during which movement the staple is completely formed, and then begins its action whereby the arms 29 30, then carrying a formed staple onward, are withdrawn while the same are approaching the clenching-die, the operation being such that the withdrawing action of said bending-arms will first slowly proceed, as the major part of the transit toward the setting point is made, and result in exposing the staple-legs or causing them to protrude from the said arms in position, but still supported thereby, to impale the material to be stapled and enter into the setting-die. This stripping movement gradually proceeds until the arms and staple carried thereby are closely approaching the setting-point, whereupon the roll 74 of the rock-arm 73 will encounter the part 13 of the cam 75 and thus quickly complete the withdrawing action of these arms, at which moment the setting of the staple-legs is accomplished by coaction with the clenching-die. The reverse movement of the rock-arm 73, and consequently that of the arm 41, at once begins and the outward protrusion of the arms 29 30, the arm 41 then passing the center and gradually allowing the springs to act to protrude said tools until they are seated, thus avoiding the blow which the springs uncontrolled would occasion, and said arm still moving reaches a point in said slot in which it does not bear again until another withdrawal is to take place, thus allowing an elongated cam 75 or one producing an easy movement to be employed.

The stationary curved forming-anvils 50 are fastened to the framework to overhang the cylinder C, being longitudinally so located with respect to that cylinder as to coincide with the rotary paths of travel of the stapling-tools and properly coöperate therewith. In a general sense the under face of this anvil is coincident with the periphery of the cylinder C, but its rear end is curved eccentrically, so as to form such a wedge-like entrance end for the passage of the wire length over it as to accomplish the formation of the staple, as will hereinafter appear. At its said rear end this anvil has a detachable piece 83, that is provided on its face with a central projection 84, which diminishes in a forward direction until it vanishes and becomes coincident with the general face of the anvil 50. It is of a width suitable to be engaged by the central portion or crown of the staple length of wire, and the projecting end of the driver 32 has a slight central recess 12 to enable it to pass over the projecting rib 84, as is seen in Fig. 22. This piece 83 of the anvil 50 is recessed rearwardly of the projection or rib 84 to receive a projecting abutment 85, which is of a width equal to that of the projection 84 and of a slight length. It has a considerable body portion, by which it is pivoted in this recess, and its forward end normally rests against the wall of the mortise, as in Fig. 24, where it is held thus seated by a leaf-spring 86. The abutment proper or projecting part 85 has an angular face which normally projects a little below that of the projection or rib 84, as in Fig. 24.

The rear end of the abutment 85 constitutes the wire-receiving supporting-surface for the wire while being fed into position for cutting and while being cut by the cutting-blade 8, at which time the projecting abutment 39 of the staple-driver or setting-tool and the shoulders $m$ $n$ of the bending-arms 29 30 constitute an abutment which contacts with the wire and holds it while being severed and moved onward. As the bending-arms and setting-tool, both protruded to their full extent, as in Fig. 10, approach the wire-receiving point the forward slightly-beveled or wedge-like portions of said arms and tool pass beneath the wire then lying against the abutment 85 and pocket it to prevent its displacement, as in said figure, lifting it, if necessary, snugly against the anvil behind the said abutment 85. The wire will thus be confined in a four-walled pocket formed by the end of the stapling-tool and its abutment and the face of the anvil and its abutment. As the stapling-tools advance the abutment with which they are provided—viz., the shoulders $m$ $n$ and abutment 39, then alined—bear against it and momentarily nip it while it is severed, thereafter acting to carry it onward, in which action and movement the abutment 85 first acts as a nipping member to hold the wire length during the operation of cutting it from the main body of wire and during its initial forward movement of onward travel, and thereafter as a yielding support for the guidance of the wire length in the operation of forming it into a staple, the abutment 85 first resisting under the action of its spring 86 and then yielding so that the wire length severed while supported between the two abutments is immediately pressed off from the rear end of the abutment and onto its face, which movement of it causes the abutment 85 to rise so that its under face becomes alined with the projecting rib 84, as in Fig. 25, the wire length while being cut and thereafter until set being thus held in contact with the setting-bed 40, while the ends of the wire length are being bent up into staple form by the anvil 50 forcing them into the grooves in the bending-arms 29 30, as the setting-bed descends, which operation gradually proceeds as the anvil is traversed by the tools and the plane face of the anvil 50 and that part of it coincident with the surface of the carrier C is reached. The rear or wire-engaging end of the abutment 85 has a slight outward pitch forward, so that while it will resist sufficiently to aid in the nipping of the wire so as to hold the severed wire length the pitch of its end will allow the wire length to pass up onto and ride over its face. This operation would be performed if this abutment 85 was fixed and not spring-seated, so that it constituted an elongation of the rib 84, substantially as is shown in Fig. 25, and hence in a broad sense it is a member coöperating with the forming-tools, which is to be considered as if it were rigid and without widthwise limit within the dimensions of the anvil. This latter species of this branch of the invention is claimed in a companion application, Serial No. 566,347. At its forward end this anvil 50 is provided with side grooves 4 5 to receive the staple-legs, and with side plates 14 15 having inwardly-beveled inner faces opposed to said grooves, (see Fig. 20,) whereby the extremities of the staple-legs are given an additional bend in the direction in which they are ultimately bent in the clenching operation. These plates 14 15, (see Fig. 21,) have their inwardly-projecting bearing-ledges increased or wedge-like from rear to front, so that the staple-legs bent at right angles to the crown in passing over the main portion of the anvil 50 (but which lose that relation to their crowns owing to the resiliency of their composing steel wire) may enter between these angular-ledged plates 14 15 and passing over them be given an additional inward bend, the grooves 4 5 receiving said inwardly-bent ends and allowing them to pass freely off this anvil and without distortion.

The setting-dies 46, with which the cylinder D is provided and with which the staple-setting tools coact in performing the clenching operation, are made adjustable therein and are constructed as follows: Each die is constructed so as to be supported in a holder 44, as will be presently explained, and this holder 44 is a long narrow member, (see Fig. 26,) having a curved face corresponding to the arc of the cylinder which carries it, said holder being supported in a recess or seat formed in the cylinder and the rearward or die-carrying end of which holder projects into a recess in which the rotating folding-blade is housed, said blade being recessed to escape the die in its rotation, as is described in said Patent No. 510,528. The die 46 is but a slight recess curved, as is described in said patent, so as to properly perform the clenching action. Said die is preferably a steel block with beveled sides, as shown, to capacitate it to be held in a properly-shaped recess 45 at the end of the holder 44, its retention in the holder being secured by means of set-screws 88 89. The holder 44 is held in its seat in the carrier or cylinder D by means of screws 93, 94, and 95, the holes $u$ $w$, through which the screws 93 94 pass, being large enough to admit of lengthwise adjustment of the holder, controlled by the eccentric head of the screw 95 bearing against the wall of the hole $x$, which it snugly fits.

It will have been observed that the stapling-tool, in so far as its functions of holding the wire while it is being severed and of advancing the severed length over the under face of the forming-anvil is concerned, has a recess 12, that enables it to pass over the rib projecting centrally from the anvil as well as to avoid interference with the abutment 85.

Having thus set forth the construction and arrangement of the various parts, the operation of forming, setting, and clenching a staple will now be explained.

The associated plies of material passing between the carriers C D have two staples set so as to form a transverse binding-line therein. As the mechanisms are moved the wire-feeding devices are in operation by reason of the pinion 145 being secured in mesh with the driving-wheel 134 and operate to advance the wire beneath the anvil 50 to a length sufficient for the formation of a staple at each semirevolution of the carrier C. The outward feeding movement of the wire projects it over the face of the cutting-blade 8 and under the face of the rear end of the anvil 50 in close proximity to or against the angular rearward edge of the abutment 85, the protruded end thus being supported for the action of the tools that are to operate upon it. This protrusion of the wire length is so timed that although the wire-feed is a constantly-operating one a proper length will be presented to the action of the staple-forming tools in their rotative sweep or circular path of travel. As each staple-forming tool in its rotative travel reaches the point where the wire length is protruded the abutment of the bending-arms and the setting-tool simultaneously contact with the wire length and bear it snugly against the abutment 85, while the tappet 47 engages the cam-face of the cutting-blade 8, (see Fig. 9,) so that the cutting of the wire length takes place while the wire is nipped by or confined between the abutment 85 on the anvil and the abutment formed by the shoulders $m$ $n$ and projection 39 on the stapling-tools, the result being that the wire length is prevented from jumping or otherwise being moved out of place during or after its severance, and will thereafter be surely held and transported through the necessary operations of forming it into a staple and setting it instead of flying out of the tools or becoming displaced therein, as such light bodies are liable to do when unsupported even momentarily. After the wire length is severed it is moved from the position shown in Fig. 24 up onto the face of the abutment 85, as in Fig. 25, which movement will have rocked said abutment upward until it is arrested in facial alinement with the rib 84. Meanwhile the wire length being carried onward over the anvil 50 is gradually pressed thereby, owing to the eccentric relation of the face of the anvil to the carrier C, into staple form by the coaction of the arms 29 30 with said anvil, as is well understood, the result being that by the time it reaches the point where the recesses 4 5 begin the wire length will have been formed into a complete staple, the legs of which will be at right angles to its crown. Thus formed they will spring apart and destroy this right-angular form; but as they enter and pass between the faces of the angular ledged plates 14 15 they will have their outer or free ends bent inwardly, as is illustrated in Fig. 20, said bent ends entering into the recesses 4 5, by which operation their ends are bent into a shape that will prevent any tendency for them to spread apart in the setting and clenching operation, or, otherwise stated, so shaped that in the operations of inserting them and finally clenching them the action of the tools upon them will be aided in the performance of a perfect clenching action, with the staple-legs laid snugly together and flat upon the face of the material.

The formed staple complete as such when it passes off the forward end of the anvil 50 is held in the arms 29 30 with its crown practically on a line with the surface of the cylinder and with its legs protruded therefrom and pointed in the direction it is to take in entering through the material. As the rotation of the carrier proceeds the protruded legs are brought into contact with and forced through the material as the point of contact between the carriers C D is approached, and during the close approach to this point and passage thereof by the stapling-tools the staple-legs will enter into the setting-die and be gradually bent or clenched down thereby, the arms 29 30 receding in timely coaction with the clenching movement of the staple-legs.

It remains to be said that the abutment projecting from the curved anvil may be a stationary device and that the member of the stapling tools coöperating therewith to sustain the wire while it is being severed may be the staple-leg, forming arms only as in my companion application, Serial No. 566,347, filed October 21, 1895, either or both of which devices are to be understood as comprehended in a broad sense in this application, while in said companion application the devices therein contained are claimed as subordinate to the claims of the present application.

What is claimed is—

1. The combination with means for feeding wire across the same, of a forming-anvil over whose face the staple length of wire is swept in forming the staple, and an abutment projecting from the face of said anvil against the rear of which the wire is supported, and means for severing the wire end into a staple length, substantially as described.

2. The combination with means for feeding wire onward, means for severing the same into staple lengths, a forming-anvil over whose face each length of wire is swept in forming the staple, and an abutment projecting from said anvil for supporting the wire, of mechanism traveling over said anvil and operating to bear the wire length first against the abutment and then carry it over the face of the anvil to form the staple, substantially as described.

3. The combination with means for feeding wire onward, means for severing the same into staple lengths, a forming-anvil over whose face each wire length is swept in forming the staple, and an abutment projecting from said anvil having a beveled rear or wire-engaging face for supporting the wire, of mechanism traveling over said anvil and operating to bear the wire length first against the beveled rear or wire-engaging face of said abutment and then carry it over the face of the anvil to form the staple, substantially as described.

4. The combination with means for feeding wire onward, means for severing the same into staple lengths, and a forming-anvil over whose face each wire length is swept in forming a staple, and an abutment projecting from the face of the anvil at its entrance end and vanishing therefrom into the general face of the anvil for supporting the wire, of a staple-bending tool traveling over said anvil and having a member which operates to bear the wire length first against the abutment and then over its face, substantially as described.

5. The combination with means for feeding wire onward, means for severing the same into staple lengths, and a forming-anvil whose face is provided with a central rib constituting a projecting abutment for supporting the wire, of a staple-bending tool traveling over said anvil and a setting-tool having a recessed plate which operates to bear the wire length first against the abutment and then over the face of the anvil, substantially as described.

6. The combination with means for feeding wire onward, means for severing the same into staple lengths, and a forming-anvil whose face is provided with a spring-seated projecting abutment for supporting the wire, of mechanism traveling over said anvil and operating to bear the wire length first against the abutment and then carry it over the face of the anvil to form the staple, substantially as described.

7. The combination with the forming-anvil and means for bending a wire length on said anvil into a staple with the legs substantially at right angles to its crown, of means for thereafter bending the extremities of said staple-legs inwardly or toward each other before the setting of the staple, substantially as described.

8. The combination with the forming-anvil and means for bending a wire length on said anvil into a staple with the legs substantially at right angles to its crown, of means for thereafter bending the extremities of said staple-legs inwardly or toward each other and recesses in said anvil for receiving said bending extremities, substantially as described.

9. The combination with the forming-anvil and means for bending a wire length on said anvil into a staple with the legs substantially at right angles to its crown, of means for thereafter bending the staple-legs inwardly or toward each other before the setting of the staple, substantially as described.

10. The combination with the forming-anvil and means for bending a wire length on said anvil into a staple with the legs substantially at right angles to its crown, of plates 14, 15 near the sides of the anvil for thereafter bending the extremities of said staple-legs inwardly or toward each other and recesses in the sides of said anvil for receiving said bending extremities, substantially as described.

11. The combination with the forming-anvil and means for bending a wire length on said anvil into a staple with the legs substantially at right angles to its crown, of angular ledged plates having beveled edges for thereafter bending the extremities of said staple-legs inwardly or toward each other, substantially as described.

12. The combination with the forming-anvil and means for bending a wire length on said anvil into a staple with the legs substantially at right angles to its crown, of angular ledged plates having beveled edges for thereafter bending the extremities of said staple-legs inwardly or toward each other and recesses in said anvil for receiving said bending extremities, said plates having wedge-like faces for overbending the staple-legs, substantially as described.

13. The combination of means for severing wire into staple lengths, an anvil over whose face each length of wire is swept in forming a staple, and means for bending the extremities of the staple-legs inward beyond a position at right angles to the crown before the staple is inserted into the material to be stapled, substantially as described.

14. The combination with the staple-setting tool and the setting-die carrier, of a removable plate supporting said die, holding means therefor which permit longitudinal movement, and an adjusting-screw provided with an eccentric whereby fine adjustments are secured, substantially as described.

15. The combination with a staple-bending tool coacting with an anvil in forming a length of wire into a staple by sweeping over said anvil, of a rock-arm 41 for controlling said stapling-tool in its relation to said anvil, a rocking shaft 72 for actuating said rock-arm 41 and means for adjusting said rock-arm, substantially as described.

16. The combination with a curved anvil and a stapling-tool supported in a rotating carrier and sweeping over the surface of said anvil, of means for controlling the inward movement of the stapling-tool, consisting of a rock-arm 41, a cam and spring for controlling the movement of the rock-arm 41, and means for adjusting the said rock-arm 41 consisting of a toe 70 and an adjusting-screw with which said toe contacts, substantially as described.

17. The combination with a curved anvil and a stapling-tool supported in a rotating carrier and sweeping over the surface of said anvil, of means for controlling the inward movement of said tool in its carrier, the same consisting of rock-arm 41 connected therewith through an elongated recess, a cam and spring for controlling the movement of the rock-arm 41 and a means for adjusting said rock-arm 41 consisting of a toe 70 and an adjusting-screw with which said toe contacts, substantially as described.

18. The combination with means for feeding the material to be stapled onward through a staple making and setting mechanism, of wire-feeding devices supplying the wire thereto, and a changeable gear for suspending the operation of the wire-feeding devices while the first-mentioned means continue in operation, substantially as described.

19. The combination with means for feeding the material to be stapled onward through a staple making and setting mechanism, of a wire-feeding driving-shaft, a driving-pinion therefor splined on said shaft, and means for moving said pinion into and out of gear with its driving-wheel, substantially as described.

20. The combination with means for feeding the material to be stapled onward through a staple making and setting mechanism, of a wire-feeding driving-shaft, a driving-pinion therefor splined on said shaft and movable into and out of gear with its driving-wheel, a collar on said pinion and retaining-arm to hold said pinion in place, substantially as described.

21. The combination with mechanism for feeding the material to be stapled onward through the staple making and setting mechanism, of wire-feeding mechanism, mechanism for throwing the said wire-feeding mechanism out of action while the material-feeding mechanism continues in operation, and means for operating said wire-feeding mechanism manually and independently of the power which operates the machine, substantially as described.

22. The combination with means for feeding the material to be stapled onward through a staple making and setting mechanism, of a wire-feed-actuating shaft 132 and its driving-wheel 134, a pinion 145 splined so as to slide on said shaft, a sliding holding-arm 98 therefor, and means securing the said parts in their adjustments, substantially as described.

23. The combination with the stapling-tools, of the shaft 72, its arms 41, rock-arm 73, spring-pressed rod 76, rock-arm 77, and cam 75, substantially as described.

24. The combination with the forming-anvil and its abutment, of a second and moving abutment for engaging the wire length and pressing it against the first-mentioned abutment, and means for raising the wire length into position behind the first-mentioned abutment prior to the severance of the wire, substantially as described.

25. The combination with the forming-anvil and its abutment, of a stapling-tool having an abutment for engaging the wire length with portions projecting forwardly therefrom and slightly beveled or wedge-like, which act to raise the wire length into position behind the abutment on the anvil prior to the severance of the wire, substantially as described.

26. The combination with the forming-anvil and its abutment, of a stapling-tool having an abutment for engaging the wire length and a forwardly-projecting end overlapping said abutment on the anvil prior to the severing of the wire, said abutment and forwardly-projecting end in connection with the anvil and its abutment thus forming a four-walled pocket receiving and retaining the wire length when severed, substantially as described.

27. The combination with a cylinder carrying staple-bending arms, of a socket therein to receive the spring-seated base 31 by which the bending-arms are carried, a closing-cap 90 having guideways for said bending-arms and forming a stop for limiting the outward protrusion of the arms from the cylinder, substantially as described.

28. The combination with the staple-bending arms and their rotating carrier, of a rock-shaft 72 for withdrawing said arms provided with a rock-arm 41 adjustable with respect to the rock-shaft 72, substantially as described.

29. In a staple-forming mechanism, the combination of a stationary forming-anvil having a wire-intercepting abutment or seat across the face thereof, staple-bending arms provided with slight transverse shoulders for intercepting the protruded wire and operating in connection with said abutment or seat to hold the wire while a staple length is being severed and then carrying the severed staple length onward, substantially as described.

30. In a staple-forming mechanism, the combination of a stationary forming-anvil having a wire-intercepting abutment or seat across the face thereof, staple-bending arms provided with slight transverse shoulders for intercepting the protruded wire and operating in connection with said abutment or seat to hold the wire while a staple length is being severed, a pivoted wire-cutter and a tappet 47 carried by one of the bending-arms for rocking said cutter, substantially as described.

In testimony whereof I have hereunto set my hand in the presence of two subscribing witnesses.

LUTHER C. CROWELL.

Witnesses:
H. T. MUNSON,
A. L. KENT.